United States Patent [19]

Wurzenberger

[11] Patent Number: 5,406,484
[45] Date of Patent: Apr. 11, 1995

[54] METHOD AND ARRANGEMENT FOR RELOADING PROCESSOR CONTROL PROGRAMS

[75] Inventor: Richard Wurzenberger, Munich, Germany

[73] Assignee: Siemens Aktiengesellschaft, Munich, Germany

[21] Appl. No.: 119,547

[22] Filed: Sep. 13, 1993

[30] Foreign Application Priority Data

Mar. 31, 1993 [DE] Germany .............. 43 10 581.5

[51] Int. Cl.⁶ .............................................. H04B 1/00
[52] U.S. Cl. ............................. 364/426.01; 364/449; 340/825.04
[58] Field of Search ............ 364/426.01, 426.02, 364/426.03, 191, 449; 371/24, 30; 340/825.04; 180/168

[56] References Cited

U.S. PATENT DOCUMENTS

| | | | |
|---|---|---|---|
| 4,819,174 | 4/1989 | Furuno et al. | 364/444 |
| 4,882,694 | 11/1989 | Brubaker et al. | 364/424.02 |
| 4,970,648 | 11/1990 | Capots | 364/424.06 |
| 5,025,486 | 6/1991 | Klughart | 455/54 |
| 5,157,610 | 10/1992 | Asano et al. | 364/424.03 |
| 5,172,321 | 12/1992 | Ghaem et al. | 364/444 |
| 5,214,793 | 5/1993 | Conway et al. | 455/49.1 |

FOREIGN PATENT DOCUMENTS

0021060  1/1981  European Pat. Off. .

Primary Examiner—Kevin J. Teska
Assistant Examiner—Susan Wieland
Attorney, Agent, or Firm—Hill, Steadman & Simpson

[57] ABSTRACT

In a read only memory protected against erasure in processor-controlled apparatus, the loading occurs via a wireless data transmission interface. The processor-controlled apparatus is a mobile apparatus in which a loader provided for loading the read only memory is installed. This loader controls the communication of the data transmission interface as well as the erasing and reprogramming of the read only memory. The processor control program or program parts thereof to be reloaded are requested by the processor-controlled apparatus in blocks from a reloading station which likewise has a wireless data transmission interface and are written into the read only memory. The individual program blocks are protected by check sums in the block-by-block transmission. After the end of the programming, the processor control program that has been reloaded is checked by length comparison and check sum comparison to ensure that the data transmission was error-free.

15 Claims, 1 Drawing Sheet

METHOD AND ARRANGEMENT FOR RELOADING PROCESSOR CONTROL PROGRAMS

BACKGROUND OF THE INVENTION

The present invention is directed to a method for reloading processor control programs that are loaded into a read only memory protected against erasing in processor-controlled apparatus and is directed to an arrangement for implementation of the method of the present invention.

Processor-controlled apparatus always requires a program for controlling the processor, generally referred to as software. In an apparatus that has a permanently prescribed set of functions to implement, as is often the case in EURO-SCOUT vehicle apparatus, this program is normally stored in a read-only memory, a program memory module such as, for example, RUMs, PROMs, EPROMs. Given changes due to technological progress or due to error corrections as well as given expansions of the scope of functions, it is often necessary or at least useful to modify this control program once or more after delivery of the apparatus. To this end, the microprocessor-controlled apparatus must usually be retrieved and opened in order to replace the program memory module.

Thus, for modification of the control program the prior art apparatus had to be centrally collected or opened at the place of employment for the appertaining memory modules to be replaced. When the memory modules were replaced in this manner the old modules had to be replaced by new modules. When the old modules were soldered into the circuit, the replacement could only ensue on the basis of cost-intensive unsoldering and soldering that are susceptible to error. Disadvantageously, such program modifications were avoided insofar as possible or only carried out in the most urgent cases because of the work outlay required for the purpose and the costs thus incurred.

It is an object of the present invention to provide a method and an arrangement that allow a processor control program or parts thereof to be input into a processor-controlled apparatus in a simple and fast manner without having to replace the program memory module.

In general terms the present invention is a method for reloading processor control programs that are loaded into a read only memory protected against erasing in processor-controlled apparatus. The loading ensues via a wireless data transmission interface. The processor-controlled apparatus is a mobile apparatus in which a loader is installed. This loader controls communication of the data transmission interface as well as the erasing and reprogramming of the read only memory. The processor control program to be reloaded or program parts (fragments) thereof are requested in blocks by the processor-controlled apparatus from a reloading station which likewise has a wireless data transmission interface. The processor-controlled program or the program parts is loaded into the read only memory. The individual program blocks are protected by check sums during the block-by-block transmission. After the end of the programming, the reloaded processor control program is checked by length comparison and check sum comparison to determine if the data transmission occurred error-free.

In an arrangement of the present invention for the implementation of the method of the present invention the reloading station is formed by a fixed station having a computer, having an interface and having a display means. The processor-controlled apparatus is formed by an on-board computer arranged in the vehicle and has an interface.

In the method of the present invention, the processor control program that is written in a read only memory protected against erasure in a program-controlled apparatus is rewritten via the wireless data transmission interface. The processor-controlled apparatus, which can be a mobile apparatus, has the loader provided for this purpose and a correspondingly fashioned program memory. The loader controls the communication of the data transmission interface as well as the erasure and reprogramming of the read only memory. The processor control program or a part thereof to be reloaded is requested block-by-block from a reloading station with a wireless data transmission interface, and is written in the read only memory. The individual program blocks are protected by check sums in the block-by-block transmission. After the end of the programming of the reloaded processor control program, a check to determine whether the data transmission occurred error-free is carried out on the basis of length comparison and check sum comparison.

The method of the present invention has the advantage that a new, improved or at least partially required control program can be written into the mobile, processor-controlled apparatus at suitable reloading stations without performing operations on the apparatus. For example, a plurality of program versions can be newly available, but a user of the processor-controlled apparatus requires only one of these programs. The reloading station therefore expediently offers the available programs or program versions. Information blocks are cyclically transmitted by means of which the available programs are recognized and can then be selected by the user or can be automatically selected by the apparatus. Advantageously, infrared light can be used as the transmission media.

The method of the present invention can be advantageously employed in a known traffic routing and information system (for example, EURO-SCOUT; see European reference EP 00 21 060). In this system the mobile apparatus which is usually installed in the vehicle is expediently informed of the presence of a reloading control program via transmission beacons of the known traffic routing and information system.

An arrangement which has a reloading station is provided for the implementation of the method of the present invention. This reloading station is formed by a fixed station a computer, a data transmission interface and a display means. The arrangement also has a processor-controlled apparatus in the form of an on-board computer that is located in the vehicle. A wireless data transmission interface is likewise arranged thereat.

Expediently, the reloading station is a one-lane drive-through station into which the vehicle drives and parks for the duration of the reloading.

In another expedient development of the present invention, the reloading station is a gas station, so that the program to be reloaded can also be written into the on-board computer while the tank of the vehicle is being filled.

In a further development of the present invention, the reloading station is a multi-lane drive-through station for the simultaneous reloading in a plurality of vehicles. It is especially advantageous in the arrangement of the present invention to use data transmission interfaces in the form of infrared interfaces of the known traffic routing and information system. In order to indicate the reloading event, display devices are provided in the reloading station. Alternatively, the display means present in the vehicle of a vehicle equipped for the known traffic routing and information system is used, whereby this display is transmitted into the vehicle from the loading station and displayed in the vehicle.

Instead of the specific reloading stations, is also possible to use infrared beacons of the traffic routing and information system for the reloading or rewriting of the control programs into the read only memories of the vehicle. In this embodiment the processor control program to be loaded is transmitted into the vehicle segment-by-segment, i.e., from beacon to beacon. This has the advantage that separate reloading stations are not required. The writing of a complete program, however, lasts longer than the normal contact time with a beacon, so that the control program to be reloaded is transmitted in sections, i.e., each part to a different beacon that the vehicle is momentarily passing.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

FIG. 2 schematically depicts a reloading station in the form of a drive-through.

DESCRIPTION OF THE PREFERRED EMBODIMENT

Figure 1:
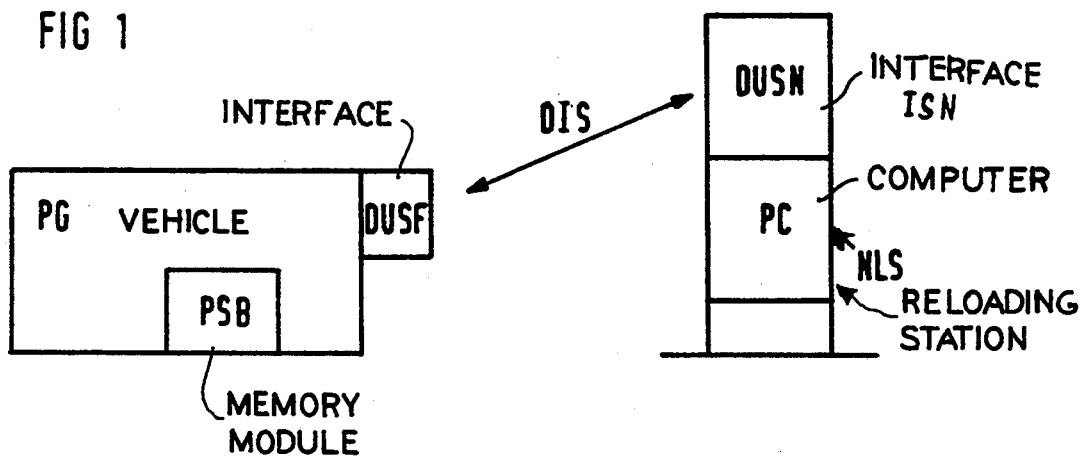
FIG. 1 schematically depicts the basic arrangement of the present invention.

As FIG. 1 schematically shows, a reloading station NLS has a computer, for example a personal computer PC, and a data transmission interface DUSN that is preferably an infrared interface ISN. The mobile, processor-controlled apparatus PG, among other things, has a program memory module PSB and a data transmission interface DUSF. Although the data transmission link DIS can be a radio link, in the depicted embodiment is an infrared transmission link.

Figure 2:
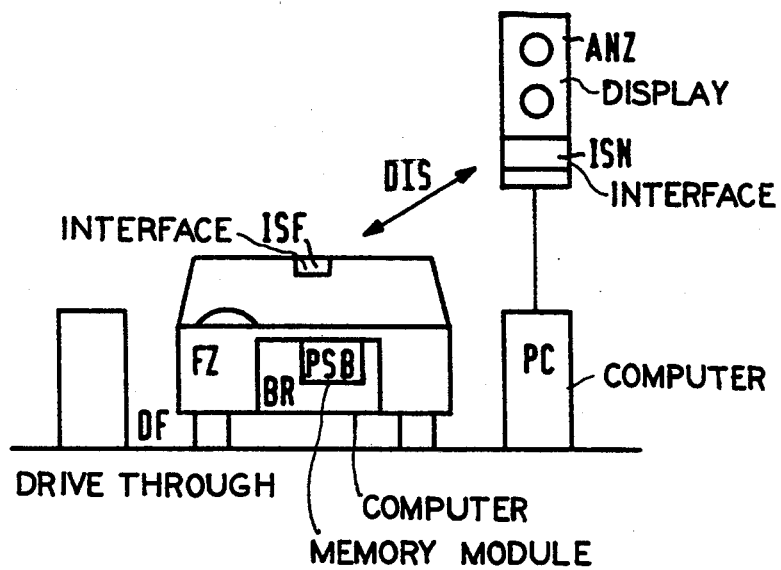

In FIG. 2, the reloading station NLS is fashioned in the form of a drive-through DF that, for example, has one-lane. The reloading station has a computer PC, a data transmission interface ISN and, additionally, a display means ANZ which indicates that, for example, loading can be carried out, that a loading event is ongoing and that a loading event is completed. FIG. 2 depicts the transmission link DIS to the vehicle FZ which has an on-board computer BR required, for example for the traffic routing and information system. The on-board computer BR has a program memory module PSB as a read only memory. The on-board computer BR is connected to the infrared data transmission interface ISF that can be arranged at the rear view mirror or at the side view mirror of the vehicle in the known system.

The reloading station can also be fashioned multi-lane, so that loading of a plurality of vehicles can proceed simultaneously. It is thereby expedient to display the loading event in the respective vehicle.

Figure 3:
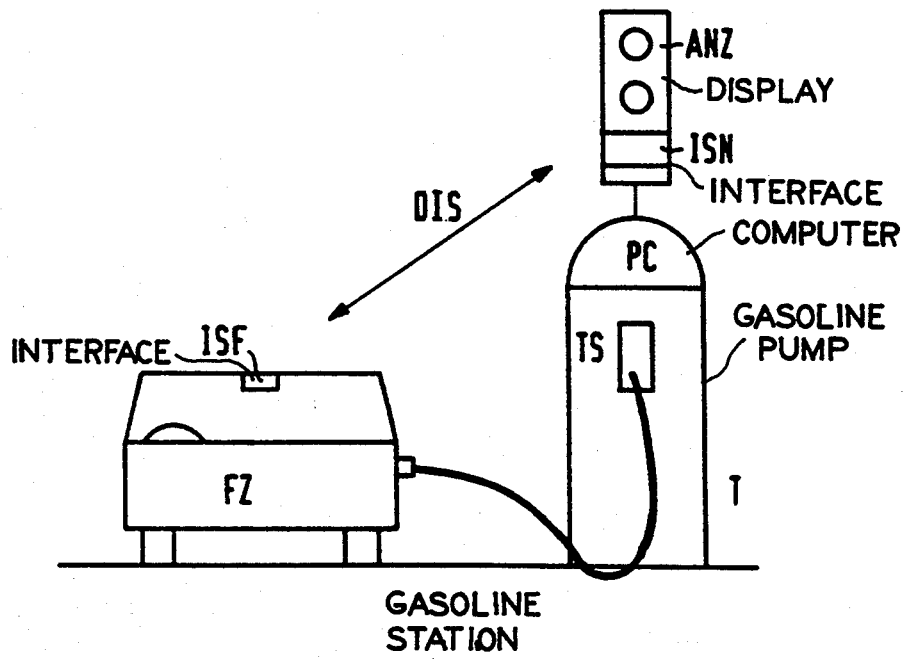
FIG. 3 schematically depicts a reloading station in the form of a gas station.

In a similar manner, FIG. 3 shows a reloading station NLS that is fashioned as a gasoline station T. For example, this reloading station can be co-integrated with the gasoline pump TS that accommodates the computer PC, the display means ANZ and the infrared data transmission interface ISN. The infrared data transmission interface ISN which transmits the program via the data transmission link DIS to the vehicle FZ that has the infrared data transmission interface ISF.

In the former instance, the vehicle can drive into the single-lane drive-through and can simply drive out in a forward direction after the loading event. In the case of the gasoline station, a new program version can be loaded into the on board computer of the vehicle while refueling the vehicle. It is possible in this way to replace or modify the control programs of preferably a mobile apparatus (specifically, a EURO-SCOUT vehicle) simply and quickly, in drive-through reloading station.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A method for a reloading processor control program into a read only memory protected against erasing in processor-controlled apparatus, comprising the steps of:

providing a wireless data transmission interface in the processor-controlled apparatus, the processor-controlled apparatus being a mobile apparatus having a means for loading and a read only memory, said means for loading controlling the communication of the data transmission interface as well as erasing and reprogramming the read only memory;

providing a wireless data transmission interface in a reloading station;

informing, via the wireless data transmission interface in the reloading station, the mobile apparatus of the presence of a processor control program or parts thereof;

requesting, via the wireless data transmission interface in the processor-controlled apparatus, the processor control program or program parts thereof to be reloaded in blocks by the processor-controlled apparatus from the reloading station;

loading said processor-controlled program or program parts thereof into the read only memory via a communication link between said data transmission interfaces of said processor-controlled apparatus and of said reloading station;

protecting individual program blocks by check sums during block-by-block transmission; and after an end of the reprogramming, checking said reloaded processor control program or program parts thereof by length comparison and check sum comparison to ensure that data transmission of the processor-controlled program or program parts thereof occurred error-free.

2. The method according to claim 1, wherein the reloading station offers available programs or program versions for reloading by cyclical transmission of an information block to said mobile apparatus.

3. The method according to claim 1, wherein the data transmission ensues by infrared light.

4. The method according to claim 1, wherein said processor-controlled apparatus is a vehicle and wherein said method is employed in a predetermined traffic routing and information system having transmission beacons, said vehicle being informed of the presence of a reloading control program via said transmission beacons of said system.

5. An arrangement for reloading a processor control program into a read only memory protected against erasing in processor-controlled apparatus of a vehicle, comprising:

a fixed reloading station having a computer connected to a wireless data transmission interface and having a display;

processor-controlled apparatus of the vehicle having an on-board computer with a read only memory and having a wireless data transmission interface; and said data transmission interfaces of said fixed reloading station and said vehicle being coupled by a communication link, the on-board computer of the vehicle controlling communication of the data transmission interface of the vehicle, as well as the erasing and reprogramming of the read only memory;

wherein the reloading station informs the vehicle of the presence of a processor control program to be reloaded or program parts thereof, wherein the processor control program to be reloaded or program parts thereof are requested in blocks by the on-board computer from the reloading station and are loaded into the read only memory via the communication link, wherein individual program blocks are protected by check sums during block-by-block transmission, and wherein after an end of the reprogramming, the reloaded processor control program or program parts thereof is checked by length comparison and check sum comparison to ensure that data transmission of the processor-controlled program or program parts thereof occurred error-free.

6. The arrangement according to claim 5, wherein the reloading station comprises at least a one-lane drive-through configuration.

7. The arrangement according to claim 5, wherein the reloading station is a gasoline station.

8. The arrangement according to claim 5, wherein the data transmission interface of the vehicle is an infrared transmission interface already present therein and the data transmission interface of the reloading station is an infrared transmission interface of a predetermined traffic routing and information system having infrared beacons.

9. The arrangement according to claim 5, wherein the display means of the reloading station indicates a reloading event.

10. The arrangement according to claim 5, wherein the infrared beacons of the traffic routing and information system are provided instead of the reloading station, whereby the processor control program to be loaded is transmitted into a moving vehicle in sections from beacon to beacon.

11. The arrangement according to claim 5, wherein the vehicle has a display means for indicating a reloading event.

12. An arrangement for reloading a processor control program into a read only memory protected against erasing in processor-controlled apparatus of a vehicle, comprising:

a fixed reloading station having a computer connected to an infrared data transmission interface and having a display;

processor-controlled apparatus of the vehicle having an on-board computer with a read only memory, having an infrared data transmission interface, and having a display means;

said data transmission interfaces of said fixed reloading station and said vehicle being coupled by a communication link, the on-board computer of the vehicle controlling communication of the data transmission interface of the vehicle, as well as the erasing and reprogramming of the read only memory;

the data transmission interface of the vehicle and the data transmission interface of the reloading station also being components of a predetermined traffic routing and information system having infrared beacons;

the display means of the reloading station as well as the display means of the vehicle indicating a reloading event;

means for informing, via the wireless data transmission interface in the reloading stations, the mobile apparatus of the presence of a processor control program or parts thereof;

means for requesting by the on-board computer that the processor control program be reloaded or program parts thereof in blocks from the reloading station; and wherein the processor control program to be reloaded on parts thereof are loaded into the read only memory via the communication link, wherein individual program blocks are protected by check sums during block-by-block transmission, and wherein after an end of the reprogramming, the reloaded processor control program or program parts thereof is checked by length comparison and check sum comparison to ensure that data transmission of the processor-controlled program or program parts thereof occurred error-free.

13. The arrangement according to claim 12, wherein the reloading station comprises at least a one-lane drive-through configuration.

14. The arrangement according to claim 12, wherein the reloading station is a gasoline station.

15. The arrangement according to claim 12, wherein the infrared beacons of the traffic routing and information system are provided instead of the reloading station, whereby the processor control program to be loaded is transmitted into a moving vehicle in sections from beacon to beacon.

* * * * *